United States Patent [19]

Posner et al.

[11] 4,389,671

[45] Jun. 21, 1983

[54] DIGITALLY-CONTROLLED ANALOG ENCRYPTON

[75] Inventors: Ronald S. Posner, Indian Harbor Beach; Charles R. Burr, Jr., Palm Bay; David K. Campbell, Melbourne Beach, all of Fla.

[73] Assignee: Harris Corporation, Melbourne, Fla.

[21] Appl. No.: 191,844

[22] Filed: Sep. 29, 1980

[51] Int. Cl.³ .............................................. H04N 7/16
[52] U.S. Cl. .................................. 358/124; 358/21 V; 358/34; 358/121; 179/1.5 FS
[58] Field of Search ............... 358/34, 21 V, 121, 124; 179/1.5 FS

[56] References Cited

U.S. PATENT DOCUMENTS

| | | | |
|---|---|---|---|
| 2,402,058 | 6/1946 | Loughren | 179/1.5 FS |
| 2,872,507 | 2/1959 | Druz | 358/121 |
| 3,054,857 | 9/1962 | Weiss | 358/121 |
| 3,124,748 | 3/1964 | Webb, Jr. | 179/1.5 FS |
| 3,440,338 | 4/1969 | Walker | 358/124 |
| 3,679,816 | 7/1972 | Avins et al. | 358/21 V |
| 3,919,462 | 11/1975 | Hartung et al. | 358/124 |
| 4,058,677 | 11/1977 | Maitland et al. | 179/1.5 FS |
| 4,075,660 | 2/1978 | Horowitz | 358/124 |

*Primary Examiner*—S. C. Buczinski
*Attorney, Agent, or Firm*—Antonelli, Terry & Wands

[57] ABSTRACT

An apparatus for scrambling a television signal in which horizontal lines of the transmitted television picture are selectively inverted in accordance with the state of a pseudorandom noise generator. In order to permit correction of the throughput gain as well as the throughput offset at the receiving end of the communication link so as to obtain a desired level of picture quality, particularly in a satellite communication system, an analog calibration signal representing both black and white levels is inserted into a horizontal line of the vertical retrace interval at the transmission end of the link. This calibration signal is then detected at the receiving end of the link and the signal levels are adjusted as needed. In addition, a randomly-varying key code signal for resetting the pseudorandom noise generator is randomly inserted into another horizontal line of the vertical retrace period to control scrambling. The audio portion of the television signal is also scrambled by randomly shifting the audio carrier between first and second offset frequencies.

11 Claims, 14 Drawing Figures

FIG. 8.
GAIN & OFFSET
EQUALIZATION CIRCUIT

FIG. 7

DIGITALLY-CONTROLLED ANALOG ENCRYPTON

BACKGROUND OF THE INVENTION

The present invention relates in general to video scrambling techniques for the protection of television transmissions, and more particularly, to a scheme for digitally-controlled analog encryption of video signals to be transmitted via satellite communication.

A number of schemes for scrambling television signals have been proposed in recent years, particularly with the advent of subscription television wherein subscribers pay to receive noncommercial television programs generally transmitted to their receivers via coaxial cables. In such systems, the secure transmission of television programs to authorized subscribers only is essential to the commercial success of the system, and therefore, encoding systems of varying complexity have been developed to prevent unauthorized receipt of such programs by those who have not paid for this service.

One general example of a system for scrambling and unscrambling communication signals is disclosed in the Hartung et al. U.S. Pat. No. 3,919,642, issued on Nov. 11, 1975, in which video scrambling and unscrambling are effected by inversion of selected horizontal lines of a transmitted television picture in accordance with various possible modes including, inversion of alternate groups of equal numbers of lines, inversion or noninversion of lines selected on a line-by-line basis in accordance with a control signal transmitted with each line, and inversion or noninversion of lines in a preselected sequence in accordance with the output of a suitable random noise generator. Along with the scrambling and unscrambling of the video signal, this prior art system also provides for scrambling of the audio portion of the transmitted signal by offsetting the audio carrier and thereby increasing the frequency difference between the video and audio carriers.

Another such system is disclosed in the Harna et al. U.S. Pat. No. 3,732,355, issued May 8, 1973, in which a video signal is encoded by switching it alternately between delayed and undelayed modes several times during each field in response to a locally-generated phase-varying rectangular switching signal which is varied randomly at random intervals in response to a series of random-state control pulses from an inhibitable random pulse generator, giving a jittered effect to the picture as the alternately-displaced bands vertically shift position in a random manner. The inhibitable random pulse generator generates an output pulse indicative of a random one of a series of possible counting states, one or more of which may be inhibited to narrow selection of the remaining states. A counter included in the generator first has random noise applied to it for a predetermined period of time, leaving the counter in an unpredictable random counting state, and then, stepping pulses are applied to step the counter to the first uninhibited state, at which time counting action ceases and a representative output pulse is developed to control the switching between modes.

Another system which is based upon the inverting of randomly-selected fields to effect scrambling of a television signal is disclosed in the Horowitz U.S. Pat. No. 4,075,660, issued Feb. 21, 1978. In this system, the transmitted signal is encoded by reversing the polarity of the video signal during randomly-selected fields and encoding bursts are injected into the composite signal prior to transmission to indicate whether or not the subsequent field has a video portion to be inverted. For purposes of encoding the audio portion of the transmitted signal, the program audio signals are modulated onto a suppressed carrier which is derived from the horizontal synchronizing signals and has a frequency equal to twice the horizontal line frequency.

In addition to systems which utilize synchronized noise generators at both the sending and receiving locations to effect encoding of the transmitted television signals, various coding systems such as disclosed in the Sherman U.S. Pat. No. 4,081,832, issued Mar. 28, 1978, and the Loshin U.S. Pat. No. 4,025,948, issued May 24, 1977, have been provided wherein the program to be broadcast is encoded to effect electrical inversion of selected groups of lines of the program thereby to scramble and disguise both the video and audio signals, and simultaneously with the coding of the program, a punchcard is prepared which is forwarded to the subscriber for use in enabling a decoder associated with the subscriber television set to permit receipt of the transmitted television signals.

In addition to the fact that the foregoing systems are often quite complicated and expensive, sometimes involving the use of punchcards for decoding, the various schemes for scrambling the video and audio signals have often proven to be less than completely foolproof. However, even more importantly, while these prior art systems may operate in a satisfactory manner in the specific environment for which they have been particularly designed, that is, transmission directly to the subscriber via coaxial cable, various problems arise when such systems are called upon to operate under different conditions and circumstances. For example, where the video communication is to be by way of satellite communication, it is extremely important to maintain a very high signal quality since the video signal must be re-transmitted for distribution. Thus, if the particular encoding scheme which is adopted results in an inherent deterioration of the signal quality, the system becomes impractical for such communication.

One of the particular problems which results from the selective inversion of horizontal lines or combinations of horizontal lines in successive television fields, as suggested in the above-mentioned prior art systems, relates to the introduction of differential nonlinearities in the transmitted signals due to gain variations and level shifting in the system with the result that the dynamic range and quality of the transmitted television picture often suffers dramatically, resulting in a "washed out" picture. In particular, with the inversion of video information, a loss in the black level reference typically results which directly affects the picture quality of the transmitted video signals. Efforts to restore the black level of the video signal upon unscrambling by clamping the signal levels at the receiver to predetermined values have proven to be less than completely satisfactory, since such compensation fails to provide a dynamic correction of the problem which requires correction of both throughput gain and throughput offset.

SUMMARY OF THE INVENTION

Accordingly, one of the features of the present invention is to provide a digitally-controlled analog encryption system for scrambling video signals in which there is provided a restoration of the black level as part of the unscrambling operation, and this black level restoration is accomplished on the basis of level signals which are transmitted with the scrambled video from the sending end of the communication link. More particularly, in accordance with the present invention, one of the unused horizontal lines forming part of the vertical retrace interval is used to carry both the white and black calibration levels. In this way, a dynamic restoration of the black level of the video signal being unscrambled is made possible while at the same time permitting dynamic correction of the throughput gain, both types of correction being essential to ensure satisfactory picture quality.

A further feature of the present invention relates to the provision of increased security in the scrambling of the video signal in a system wherein selective horizontal lines of the transmitted television picture are selectively inverted in accordance with the output of a pseudorandom noise generator (commonly known as a PN generator). This is accomplished by resetting the PN generator to a predetermined state in accordance with the output of a second PN generator. In this regard, a key is generated which is capable of setting the first-mentioned PN generator in both the scrambler control logic and descrambler control logic to a predetermined state. By inserting the key into a horizontal line in the vertical retrace interval of the clear video prior to application of the video to the scrambler, at a rate determined by the output of the second PN generator, the PN sequence which controls the scrambling and unscrambling operations will be reset and restarted at varying rates, greatly increasing the security of the encoding of the video signal to prevent unauthorized use thereof.

To even further increase the security of the scrambling operation, the key which is used to reset and restart the PN generator which controls scrambling and unscrambling can be changed at random times, such as by a further PN generator or a microprocessor.

A further feature of the present invention relates to the encoding of the audio portion of the transmitted television signal, which is accomplished by effecting two frequency offsets in the audio signal with the second frequency offset effecting a shifting of the baseband audio back and forth in frequency between first and second offset frequencies. This provides for greatly increased security as compared to the single fixed offset of the audio carrier, as disclosed in the above-mentioned Hartung et al. patent, which merely requires a knowledge of the extent of the shift in frequency of the carrier to effect a decoding of the signal. With the system provided in accordance with the present invention, the shifting of the baseband audio back and forth in frequency in accordance with one or the other of two frequency offsets controlled in accordance with the output of a PN sequence generator produces a highly-secure coding of the audio which is incapable of being deciphered simply on the basis of determination of a single frequency offset.

It is therefore an object of the present invention to provide a digitally-controlled analog encryption circuit which is capable of use with satellite communication systems.

It is another object of the present invention to provide a system of the type described which is capable of providing secure encoding of video signals without discernible deterioration in signal quality.

It is a further object of the present invention to provide a system of the type described in which enhanced security in the coding of both video and audio portions of the transmitted television signal is achieved in a system capable of maintaining high signal quality.

The objects of the present invention are achieved by a system which includes, at the transmitting end, an analog multiplexer connected in series with a scrambler in the form of a video inverter. The clear video is applied to the analog multiplexer which serves to insert into an unused horizontal line of vertical retrace interval of the television signal both black and white reference levels and a key for controlling the scrambling of the video signal. A scrambler control logic circuit includes a PN generator which is driven from the horizontal sync signals detected from the clear video supplied at the output of the analog multiplexer, the output of which controls the video inverter to effect inversion of selected horizontal lines of the television signal and this PN generator in the scrambler control logic is selectively reset in accordance with a key which has been inserted into the video signal in a selective manner by the analog multiplexer. A key logic control circuit which is operated from the horizontal sync signals includes a code selector whose output is applied to a shift register for storage of the selected key therein. A second PN generator in the key logic control circuit is driven at a lower rate keyed to the horizontal sync signals and the output thereof operates a key control circuit to selectively shift the key out of the shift register to the analog multiplexer in accordance with the state of the key control PN generator.

The descrambler which is located at the receiving end of the link is provided in the same form as the scrambler. The unscrambler control logic includes a PN generator which is selectively reset by the key received with the scrambled video signal and serves to control the operation of a video inverter to effect reinversion of the selected horizontal lines previously inserted during the scrambling operation. At the output of the video carrier, the unscrambled video is applied to a black level restoration circuit which readjusts the black level of the video signals in accordance with the black level calibration signal detected in the received video. The white level calibration signal is used at the same time to correct the throughput gain of the amplifiers, so that gain variations and level shifting are both eliminated from the received video signal.

In scrambling the audio portion of the transmitted television signal, the audio is applied to a balanced mixer where it is mixed with a fixed frequency provided at the output of a first phase locked loop. The signal provided at the output of the balanced mixer is applied to a filter where one sideband is filtered out and the result is applied to a second balanced mixer to which there is also randomly applied one or the other of two modulating frequencies selected by the output of a PN sequence generator. The output of the second balanced mixer is then applied through a bandpass filter and the resulting scrambled audio is then ready for transmission.

These and other objects, features and advantages of the present invention will become more apparent from the following more detailed description of the present invention when taken in conjunction with the accompanying drawings.

DESCRIPTION OF THE PREFERRED EMBODIMENTS

Figure 1:
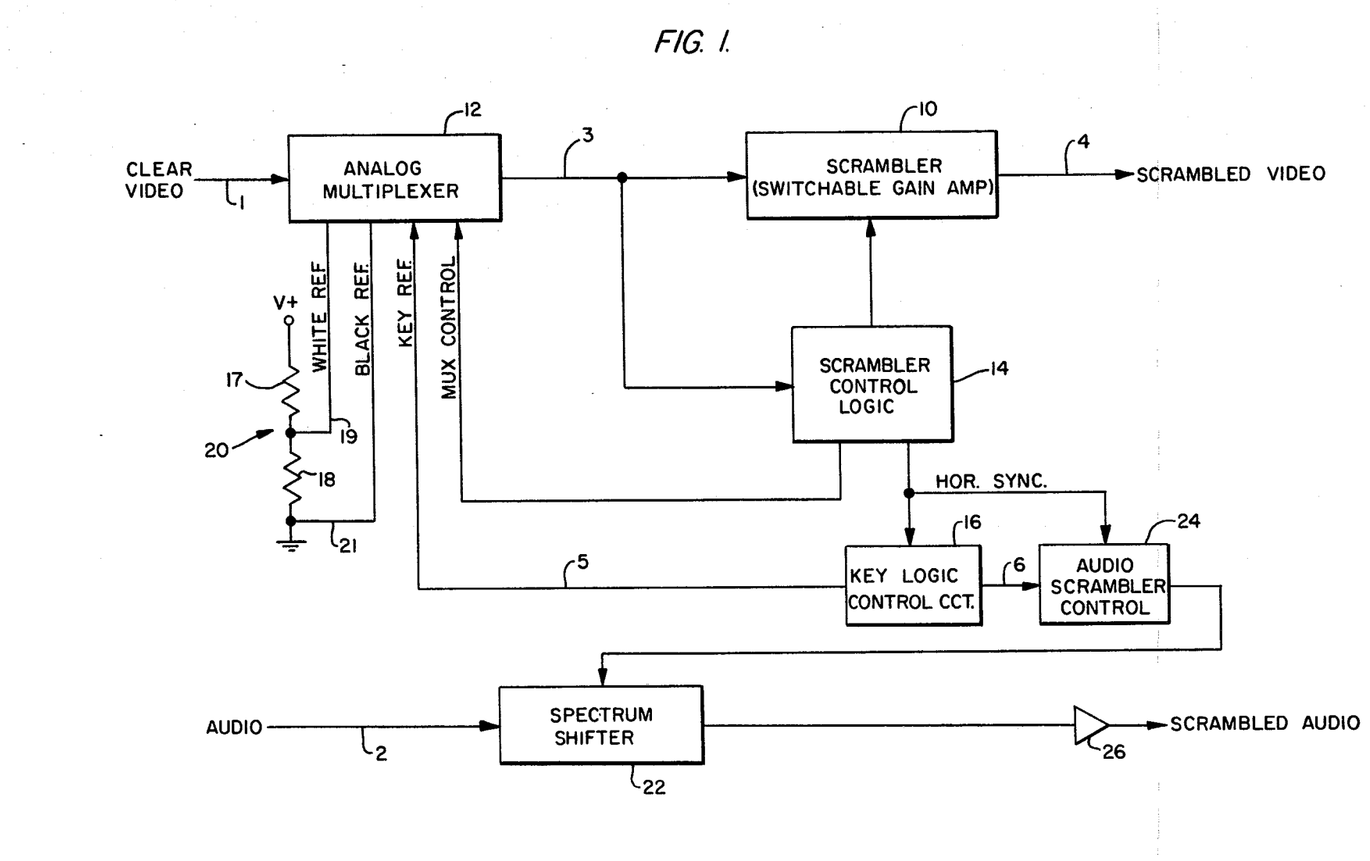
FIG. 1 is a schematic block diagram of the digitally-controlled analog encryption system in accordance with the present invention.

In the embodiment of the present invention illustrated in FIG. 1 clear video received on line 1 is applied to a scrambler 10, which may be provided in the form of a switchable gain amplifier, via an analog multiplexer 12, which serves to multiplex onto the video signal various reference and control signals under control of the scrambler control logic 14 and key logic control circuit 16. The audio portion of the television signal to be transmitted is received on line 2 and is applied to a spectrum filter 22 which is controlled by audio scrambler control 24 in response to timing signals received from the scrambler control logic 14 and key logic control circuit 16. The scrambled audio is provided at the output of the spectrum shifter 22 via an amplifier 26.

The analog multiplexer 12 which receives clear video on line 1 has the purpose of multiplexing reference control signals onto the video signal so as to ensure increased security and to enhance the picture quality of the video signal at the receiving end of the communication link. As is well known, between successive fields of a television picture, there is a vertical blanking interval during which the beam is blanked out and positioned for the start of the next field. The vertical blanking interval conventionally includes a group of equalizing pulses, some wider vertical synchronization pulses, a further group of equalizing pulses, followed finally by a number of yet unused horizontal lines which appear before the first line of video information in a new field. Using well-known multiplexing techniques, the analog multiplexer 12 under control from the scrambler control logic 14 utilizes two of the unused horizontal lines provided within the vertical blanking interval for transmission of information concerning white and black reference levels as well as a key reference for controlling the scrambling and descrambling operations to be performed at the transmitter and receiver ends, respectively, of the communication link.

The scrambler 10 receives the video signals on which there is encoded the white and black reference and key reference signals from the output of the analog multiplexer 12 and operates to invert selected horizontal lines of the transmitted television signal under control of the scrambler control logic 14. As a result of such encoding of the video signals, it is inevitable that nonlinearities due to gains and level shifting will be introduced into the video signal resulting in a commensurate degradation in the quality of the picture reproduced from the transmitted signals after decoding. Basically, it is extremely difficult to get all of the gains and all of the offsets to repeat throughout the system; accordingly, some means must be provided to correct the throughput-gain as well as the throughput offset. This is accomplished in accordance with the present invention by adding a calibration signal at the input to the video decoder which represents zero and maximum signal levels (black and white) to permit adjustment of the gain and linearity of the amplifier provided at the receiving end of the link. These calibration signals are then measured at the receiving end of the link to determine both black and white levels, and both the inverted and noninverted lines are detected and the offsets and gain variations which have been introduced during the scrambling at the receiving end of the link are corrected.

Figure 2:
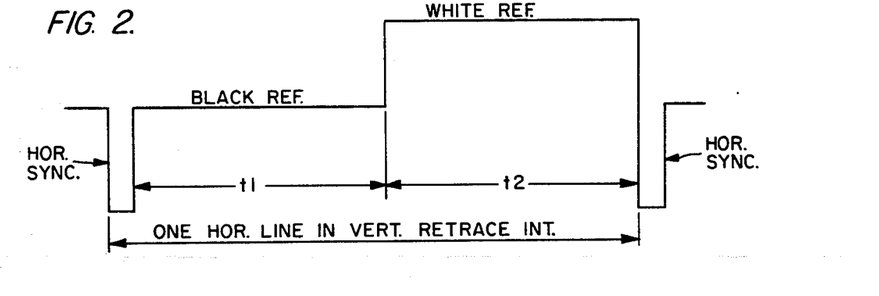
FIG. 2 is a schematic waveform diagram showing how the black and white reference levels are provided in the encoded video signal.

FIG. 2 illustrates as a schematic diagram one horizontal line in the vertical retrace interval showing the insertion of the black and white reference levels between consecutive horizontal sync pulses. It should be noted that this diagram is not to scale and does not show all of the details of the standard television signal except for the provision of the black and white reference levels which are utilized in accordance with the present invention. As seen in FIG. 1, a circuit 20 comprising resistors 17 and 18 connected in series between a fixed voltage source V+ and ground provides on the line 19 the white reference voltage level. Similarly, the black reference voltage level is supplied from ground on line 21 to the analog multiplexer 12, where these signals will be inserted into the video received on line 1 in the manner seen in FIG. 2.

Figure 3:
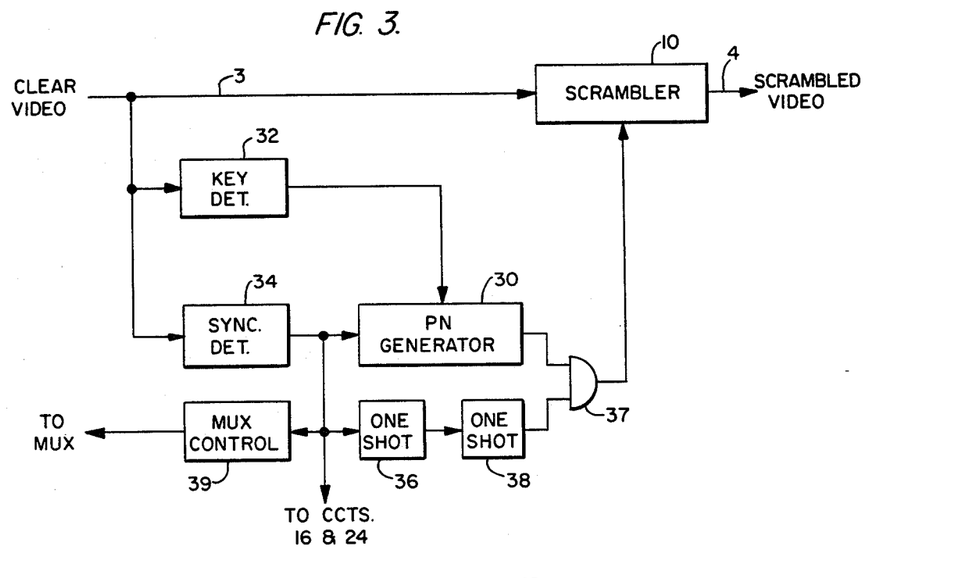
FIG. 3 is a schematic block diagram of the scrambler control logic used in the system of FIG. 1.

The details of the scrambler control logic 14 are illustrated in FIG. 3. This circuit provides for control of the selected inversion of horizontal lines in the video signal to effect encoding thereof, the selected inversion being controlled in accordance with the state of a pseudorandom noise generator 30 which operates in response to the horizontal sync pulses derived from the video signal via sync detector 34. The state of the generator 30 is controlled by the output of key detector 32. The output of generator 30 is supplied through AND gate 37 to the scrambler 10, the control of the AND gate 37 being provided from the horizontal sync pulses via a pair of one-shot multivibrator circuits 36 and 38. In addition, the control signals for the analog multiplexer 12 are provided by a multiplex control circuit 39 in response to the vertical and horizontal sync pulses supplied by the sync detector 34.

The video signals which have been encoded in the analog multiplexer 12 to include the black and white reference and key reference signals are supplied on line 3 to the key detector circuit 32 and sync detector circuit 34 simultaneously with application thereof to the scrambler 10. The key detector circuit 32 detects the key which has been encoded on the video signal by the analog multiplexer 12 and sets the PN generator 30 to the state indicated thereby. In this regard, the key may take the form of a simple reset pulse which serves to reset the PN generator 30 to an initial state or, preferably, takes the form of a coded sequence which serves to set the PN generator 30 to the state indicated by the key code. The sync detector 34 detects the leading edge of the horizontal sync pulse and uses this signal to clock the PN generator 30. This signal also is delayed by the one-shot 36 to produce a signal coincident with the beginning of video in the signal on line 3 and a further delay by one-shot 38 produces a gate signal which has the same length as the horizontal video scan line. This gate signal provided at the output of one-shot 38 enables the AND gate 37 to apply the output of the PN generator 30 to the scrambler 10, which may take the form of a switchable gain amplifier. In this way, depending on the output from PN generator 30, successive horizontal lines will be either inverted or not inverted producing a scrambling of the video on the output line 4.

Figure 4:
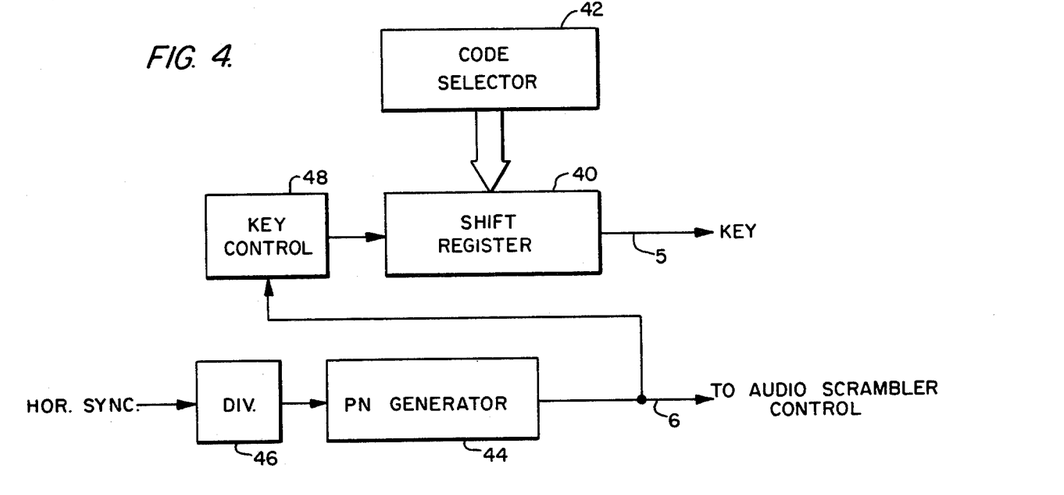
FIG. 4 is a schematic block diagram of the key logic control circuit used in the system of FIG. 1.

In accordance with the present invention, increased security in the scrambling of the video signal is accomplished by varying the key which resets and restarts the PN generator 30 in the scrambler control logic 14 at random times. This control is provided by the key logic control circuit 16, the details of which are illustrated in FIG. 4. A shift register 40 receives a coded key from a code selector 42 and this key will be selectively shifted out onto line 5 to the analog multiplexer 12 by a key control 48 under control of a PN generator 44 driven from the output of a divider 46 to which are applied the horizontal sync pulses obtained from the scrambler control logic 14. The code selector 42 may simply take the form of a manually-settable switch circuit, or it may be provided as a microprocessor or even another PN generator circuit, both of which are capable of providing randomly-variable key codes to the shift register 40.

In operation of the circuit of FIG. 4, the PN generator 44 is driven at a reduced rate keyed to the horizontal sync pulses applied to the divider circuit 46. The randomly-variable output of PN generator 44 is then applied to the key control circuit 48 which selectively applies clock signals to the shift register 40 to shift out the contents thereof onto line 5 to the analog multiplexer 12. For example, each time the output of generator 44 is a "1" the key control circuit 48 will detect this condition and apply clock signals to the shift register 40 to read out the contents thereof. Thus, a key code will be applied to the line 5 extending to the analog multiplexer 12 at a random rate and this key code will be encoded in an available horizontal line forming a part of the vertical retrace interval. At the same time the video signal is applied to the scrambler 10, as seen in FIG. 3, the key detector 32 will detect the key which has been encoded on the video signal and reset the PN generator 30 to that particular key code. Since the key code is multiplexed onto the video signal at random times, the PN generator 30 in the scrambler control logic 14 will be restarted at that particular code at random times, further complicating the coding of the video signals and rendering them more secure against unauthorized use. This is even further enhanced where the code selector 42 takes the form of a microprocessor or further PN generator circuit from which new key codes are generated at random times.

It is also possible, as apparent from the foregoing description, to eliminate the key detector 32 in the scrambler control logic 14 and to apply the key output on line 5 from the key logic control circuit 16 directly to the PN generator 30 as well as to the analog multiplexer 12. However, from the point of view of standardizing the scrambler and descrambler systems, the use of the key detector 32 in the scrambler system may be desirable.

Figure 5:
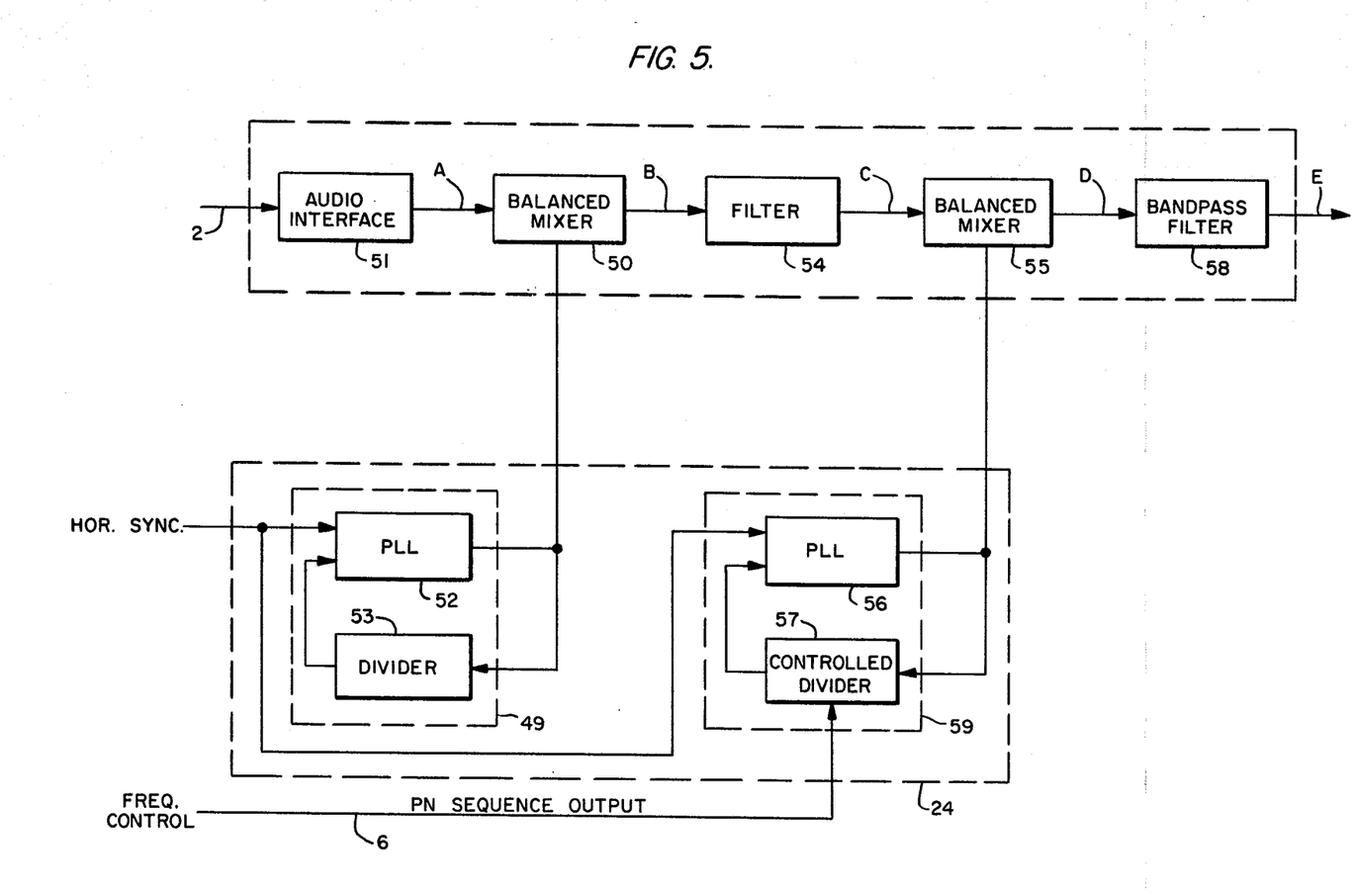
FIG. 5 is a schematic block diagram of the audio scrambler control and spectrum shifter for the audio portion of the system of FIG. 1.

As seen in FIG. 5, the spectrum shifter 22 which serves to scramble the audio portion of the transmitted television signal, includes, in series, an audio interface circuit 51, a first balanced mixer 50, a first filter 54, a second balanced mixer 55 and a bandpass filter 58. At the transmitter end of the communication link, the filter 54 in the spectrum shifter comprises a highpass filter; whereas, at the receiving end of the link, the filter 54 in the corresponding spectrum shifter will comprise a lowpass filter. The audio scrambler control circuit 24, on the other hand, comprises a first modulating signal generating circuit 49 comprising a phase-locked loop 52 and divider 53 providing a modulating frequency to the balanced mixer 50, and a second modulating frequency generating circuit 59 comprising a phase-locked loop 56 connected to a divider 57 for providing a modulating frequency to the balanced mixer 55.

Figure 6A:
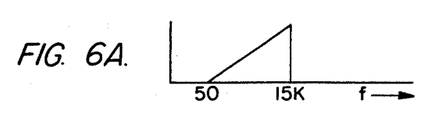
FIGS. 6A through 6G are spectrum diagrams of the spectral components of the audio signal at various points in the spectrum shifter of FIG. 5.
Figure 6B:
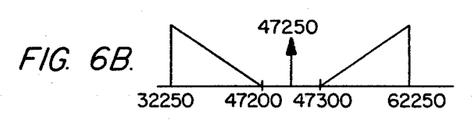
Figure 6C:
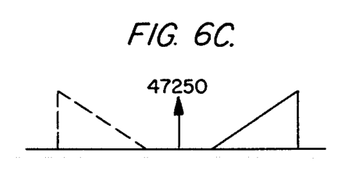
Figure 6D:
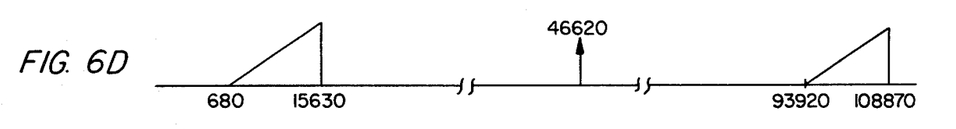
Figure 6E:
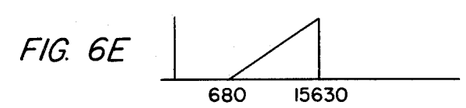
Figure 6F:
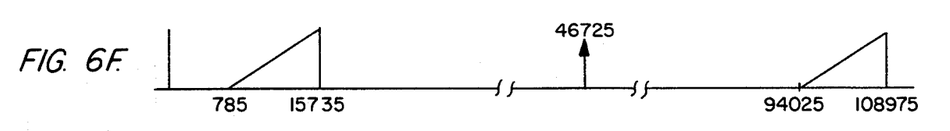
Figures 6G, 8:
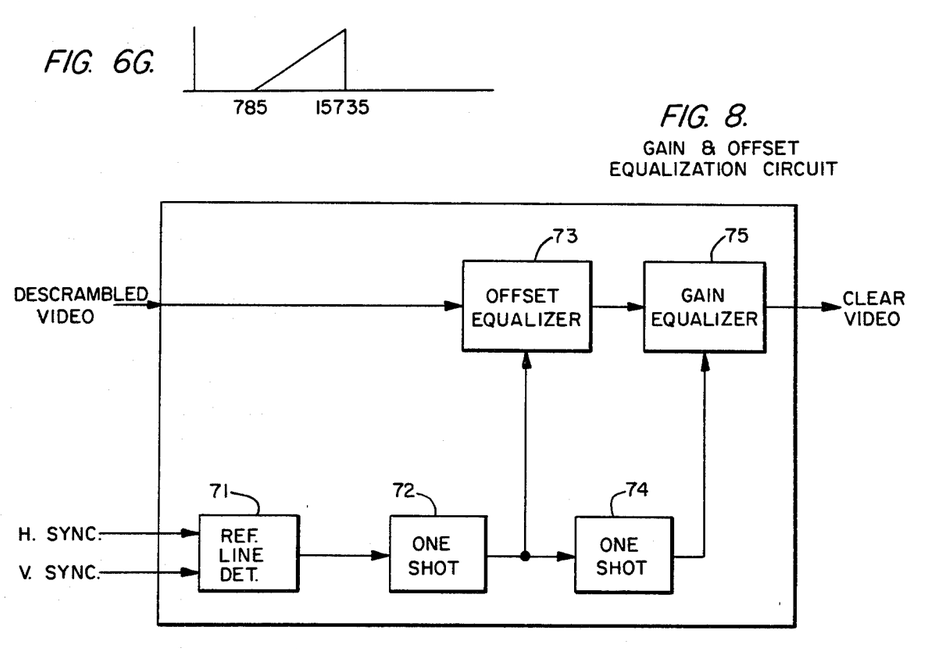
FIG. 8 is a detail block diagram of the gain and offset equalization circuit of FIG. 7.

The operation of the audio scrambler portion of the system in accordance with the present invention, which is identical to the descrambler provided at the receiving end of the communication link, will be described in conjunction with the spectral components illustrated in FIGS. 6A–6G. The audio is supplied on line 2 via the audio interface 51 to one input of the balanced mixer 50 having a spectral range generally indicated in FIG. 6A. To the other input of the balanced mixer 50 there is provided the output of the modulating signal generator 49, which is locked to a multiple of the horizontal sync frequency of the video system. Thus, the input frequency of 15,750 Hz is converted at the output of generator 49 to a stable frequency of 47,250 Hz, which becomes the carrier frequency for the modulated audio frequency signal obtained at the output of the interface circuit 51, as seen in FIG. 6B. The filter 54 connected to the output of the mixer 50 serves to filter out one sideband of the modulated signal and applies this filtered signal to one input of the balanced mixer 55. The other input of the mixer 55 is derived from the modulating signal generator 59, which is capable of selectively generating one of two modulating signals each of which represent a multiple of the horizontal sync frequency of the video system. In this regard, the divider 57 which is connected to the phase-locked loop 56 is responsive to the output of a PN sequence generator, such as the generator 44 which forms part of the key logic control circuit 16, to vary the output of the generator 59 selectively between 46,725 Hz and 46,620 Hz. As a result, the signal applied to the balanced mixer 55 is mixed back down to baseband with a second frequency offset which shifts the baseband audio back and forth in frequency across the baseband in accordance with the modulating frequency selected by the output of the PN sequence generator applied to line 6, as seen in FIG. 6D or 6F, respectively. The bandpass filter 58 then filters out the carrier and upper sidebands to leave only the lower sideband, as seen in FIGS. 6E and 6G, respectively.

As can be seen from FIG. 6, the audio scrambling operation performed in accordance with the present invention represents a double modulation scheme involving two frequency offsets in which the audio carrier is shifted randomly in accordance with the output of a PN sequence generator, thereby materially increasing the security of the scrambled signal as compared to prior schemes. This feature in combination with the random variation in key code generation and transmission as well as the incorporation of black and white level reference signals into the video signal at the transmission end of the communication link provide for a combination of increased security and picture quality.

Figure 7:
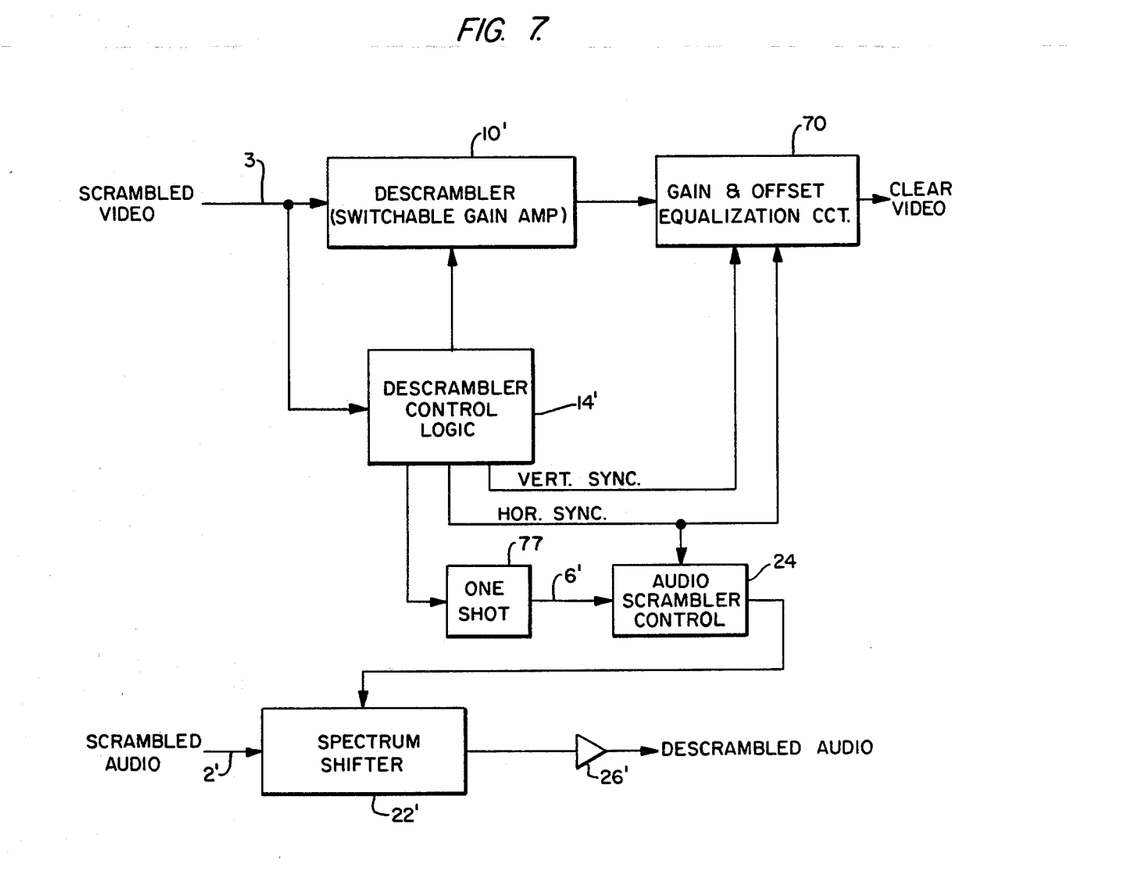
FIG. 7 is a schematic block diagram of a descrambler system in accordance with the present invention.

As seen in FIG. 7, the descrambler system which operates in accordance with the features of the present invention is essentially a complement of the scrambler system of FIG. 1. The most apparent difference between these two systems is that the descrambler system has no requirement for the analog multiplexer 12 and the key logic control circuit 16. On the other hand, the descrambler system includes a gain and offset equalization circuit 70 for control of the gain and offset in the descrambled video signal.

The descrambling operation begins with receipt of the scrambled video signal at the input of the descrambler 10'. At the same time, the descrambler control logic 14', having the same configuration shown in FIG. 3, extracts the horizontal and vertical sync signals as well as the key carried by the video signal and controls the descrambler 10' to selectively re-invert the previously-inverted horizontal lines of the video which occurred during the scrambling operation.

The unscrambled video appearing at the output of the descrambler 10' is then applied to the gain and offset equalization circuit 70 where gain and offset are equalized in accordance with the black and white levels carried by the video signal itself. As seen in FIG. 8, the detected horizontal and vertical sync pulses derived from the received video signal are applied to the reference line detector 71 which detects the horizontal line in the vertical retrace interval carrying the black and white reference levels. Upon detecting the proper horizontal line, the detector 71 triggers one-shot 72, which provides an enabling output signal to the offset equalizer circuit 73 for the time period $t_1$, during which the black reference level is being received, as seen in FIG. 2. The equalizer circuit 73 adjusts the offset at this time on the basis of the received black level, providing for sampling and holding of this reference value until receipt of the next frame, at which time a new reference will be received.

When the one-shot 72 resets at the end of time $t_1$, the one-shot 74 is triggered, providing an enabling signal to the gain equalizer 75 for the time period $t_2$ during which the white reference level is received, as seen in FIG. 2. A sample and hold circuit in the gain equalizer 75 samples the reference level and holds it until receipt of the next frame.

On the basis of the received black and white reference levels, both the offset and gain of the circuits in the descrambler system are dynamically adjusted to maintain the dynamic range and quality of the video signal. Such dynamic correction is clearly superior to fixed bias correction and other known schemes, especially in the area of satellite communications.

The descrambling of the audio signal is accomplished in a manner complementary to the scrambling operation. The audio descrambler control 24' is responsive to an output from one-shot 77, which is triggered by the key detector in the descrambler control logic 14' to reconstruct the frequency control signal, which controls the shifting of the audio back and forth in frequency across the baseband by the spectrum shifter 22'.

Thus, as can be seen from the foregoing description, the present invention provides a digitally-controlled analog encryption circuit which is capable of providing secure encoding of video signals without discernible deterioration in signal quality, providing dynamic correction of both throughput gain and throughput offset on the basis of black and white reference levels transmitted with the video signal itself.

While we have shown and described several embodiments in accordance with the present invention, it is understood that the invention is not limited thereto but is susceptible of numerous changes and modifications as are known to those of ordinary skill in the art, and we therefore do not wish to be limited to the details shown and described herein but intend to cover all such changes and modifications as are obvious to one skilled in the art.

What is claimed is:

1. An apparatus for scrambling a television signal comprising controllable means connected to receive said television signal for selectively inverting the polarity of the signals applied thereto;

scrambler control logic means responsive to synchronizing pulses in said television signal for operating said controllable means to invert the polarity of those portions of said television signal representing randomly-selected horizontal lines of a television picture, including a pseudorandom noise generator providing an output signal applied to said controllable means for selecting the horizontal lines to be inverted;

means for compensating for differential non-linearities introduced into said television signal due to gain variations and level shifting caused by the selective inversion of the polarity of said horizontal lines of a television picture by said controllable means and said scrambler control logic means, said compensating means including signal generating means for generating a calibration signal representing block and white reference levels for said television signal; and analog multiplexer means for inserting said calibration signal into a horizontal line portion of said television signal, which forms part of the vertical retrace interval thereof, for use in adjusting both the throughput gain and said throughput offset of the television signal at a receiving station, and further including key logic control means responsive to synchronizing pulses in said television signal for generating key code signals to control said pseudorandom noise generator, said analog multiplexer means being connected to said key logic control means for inserting said key code signals into a horizontal line portion of said television signal, which forms part of the vertical retrace interval thereof, and wherein the output of said analog multiplexer is applied to said controllable means for scrambling, and said scrambler control logic means includes key detector means connected to the output of said analog multiplexer for setting the state of said pseudorandom noise generator to correspond to a sequence designated by said key code signals upon detection of said signals, and wherein said key logic control means includes a shift register, code selector means for applying said key code signals to said shift register, and key generation control means including a second pseudorandom noise generator responsive to synchronizing pulses in said television signal for randomly shifting the contents of said shift register out to said analog multiplexer means.

2. An apparatus for scrambling a television signal as defined in claim 1, wherein said code selector means comprises means for randomly generating key code signals representing different sequences.

3. An apparatus for scrambling a television signal as defined in claim 2, wherein said code selector means includes a microprocessor.

4. An apparatus for scrambling a television signal as defined in claim 2, wherein said code selection means includes a further pseudorandom noise generator.

5. An apparatus for scrambling a television signal as defined in claim 1, further including audio scrambling means for randomly shifting the carrier of the audio portion of said television signal by first and second offset frequencies in accordance with the output of a pseudorandom noise generator.

6. An apparatus for scrambling a television signal comprising controllable means connected to receive said television signal for selectively inverting the polarity of the signals applied thereto;

scrambler control logic means responsive to synchronizing pulses in said television signal for operating said controllable means to invert the polarity of those portions of said television signal representing randomly-selected horizontal lines of a television picture, including a pseudorandom noise generator providing an output signal applied to said controllable means for selecting the horizontal lines to be inverted;

means for compensating for differential non-linearities introduced into said television signal due to gain variations and level shifting caused by the selective inversion of the polarity of said horizontal lines of a television picture by said controllable means and said scrambler control logic means, said compensating means including signal generating means for generating a calibration signal representing block and white reference levels for said television signal; and analog multiplexer means for inserting said calibration signal into a horizontal line portion of said television signal, which forms part of the vertical retrace interval thereof, for use in adjusting both the throughput gain and said throughput offset of the television signal at a receiving station, and further including, first means for modulating the audio portion of said television signal with a first frequency, second means for filtering out the lower sideband of the modulated signal produced by said first means, third means for modulating the output of said second means randomly with second and third frequencies, and fourth means for filtering out the carrier and upper sideband of the signal produced by said third means.

7. An apparatus for scrambling a television signal as defined in claim 6, wherein said third means includes modulating signal generating means responsive to the output of a pseudorandom noise generator for generating said second or said third frequencies.

8. An apparatus for scrambling a television signal comprising controllable means connected to receive said television signal for selectively inverting the polarity of the signals applied thereto in response to a control command signal;

scrambler control logic means responsive to the horizontal sync pulses in said television signal for operating said controllable means to invert the polarity of those portions of said television signal representing randomly-selected horizontal lines of the television picture, including a pseudorandom noise generator providing said control command signal for selecting the horizontal lines to be inverted and key detector means for setting the state of said pseudorandom noise generator to correspond to a sequence designated by key code signals carried by said television signal;

key logic control means responsive to synchronizing pulses in said television signal for generating said key code signals including code selector means for randomly generating key code signals representing different sequences and a second pseudorandom noise generator for controlling the application of key code signals to an output in a random manner; and analog multiplexer means connected to said output of said key logic control means for inserting said key code signals into a horizontal line portion of said television signal which forms part of the vertical retrace interval thereof, the output of said analog multiplexer means being connected to the input of said controllable means and said scrambler control logic means.

9. An apparatus for scrambling a television signal as defined in claim 8, wherein said code selector means includes a microprocessor.

10. An apparatus for scrambling a television signal as defined in claim 8, wherein said code selection means includes a further pseudorandom noise generator.

11. An apparatus for scrambling a television signal as defined in claim 8, further including audio scrambling means for randomly shifting the carrier of the audio portion of said television signal by first and second offset frequencies in accordance with the output of a pseudorandom noise generator.

* * * * *